United States Patent [19]

Lowe et al.

[11] Patent Number: 5,716,184
[45] Date of Patent: Feb. 10, 1998

[54] LOADER FOR STACKING PACKAGES IN SHIPPING CONTAINERS

[75] Inventors: Gary Lowe, Carrollton; David Batchelder, Dallas, both of Tex.

[73] Assignee: Fluid Lifting Systems, Inc., Dallas, Tex.

[21] Appl. No.: 509,789

[22] Filed: Aug. 1, 1995

[51] Int. Cl.$^6$ ................................................ B65G 57/112
[52] U.S. Cl. ........................... 414/398; 414/399; 414/400
[58] Field of Search .................................. 414/398, 399, 414/400, 789.7, 789.8

[56] References Cited

U.S. PATENT DOCUMENTS

| | | | |
|---|---|---|---|
| 3,458,064 | 7/1969 | McWilliams | 414/789.8 |
| 3,651,963 | 3/1972 | McWilliams | 414/789.8 |
| 3,853,230 | 12/1974 | Schultz | 414/392 X |
| 4,701,091 | 10/1987 | Yamauchi et al. | 414/398 X |
| 5,009,560 | 4/1991 | Ruder et al. | 414/392 |
| 5,201,626 | 4/1993 | Hansen | 414/398 |
| 5,325,953 | 7/1994 | Doster et al. | 198/304 |
| 5,391,038 | 2/1995 | Stewart | 414/392 |
| 5,437,537 | 8/1995 | Sweet et al. | 414/400 |

FOREIGN PATENT DOCUMENTS

| | | | |
|---|---|---|---|
| 0031224 | 2/1984 | Japan | 414/398 |
| 0093122 | 4/1987 | Japan | 414/398 |
| 0221027 | 9/1990 | Japan | 414/399 |

*Primary Examiner*—James W. Keenan
*Attorney, Agent, or Firm*—James E. Bradley

[57] ABSTRACT

A method and apparatus are provided for unloading packages from a conveyor and then stacking the packages in rows on the floor of a shipping container. A package loader is disposed at the discharge end of the conveyor and is moveable with the conveyor into different positions between the forward and aft ends of the shipping container. The package loader includes a frame. A transfer table is mounted to the frame and aligned for receiving packages from the conveyor and supporting the packages as a person arranges the packages in rows extending across the width of the shipping container. A horizontal platform is mounted to the frame forward of the transfer table. The platform is moveable to selected elevations to first align the platform for receiving packages from the conveyor and transfer table, with the packages arranged in rows, and then to align the platform for transferring the rows of the packages onto the floor of the shipping container. The platform is also moveable between rearward and forward positions for extending forward of the frame. An extendable arm is carried by the frame, for aligning adjacent to the rearward end of the platform when the platform is in the forward position. The arm then retains from moving rearward packages stacked upon the platform as the platform is moved rearward, from the forward to the rearward positions, and out from underneath the packages to stack the packages on the floor of the shipping container.

19 Claims, 7 Drawing Sheets

LOADER FOR STACKING PACKAGES IN SHIPPING CONTAINERS

BACKGROUND OF THE INVENTION

1. Field of the Invention

The present invention relates in general to equipment and methods for loading packages into shipping containers, and in particular to equipment and methods for stacking loose packages within shipping containers.

2. Description of the Prior Art

Prior art equipment has been utilized for loading loose packages into shipping containers, such as overseas shipping containers and trailers for tractor-trailer rigs. For example, fork lifts have been used to carry pallets on which packages are stacked. The pallets are usually stacked on the floor of the shipping container or a person removes loose packages from the pallets and then stacks the loose packages on the floor of a shipping container. Loose packages are usually stacked on the pallets prior to transport into a shipping container.

Another type of prior art equipment includes conveyors which are extended into shipping containers, such as expandable conveyors. Typically, a person lifts packages off the conveyor and then stacks the packages in rows on the floor of the shipping container. Some conveyors have lifting forks attached to their discharge ends, such as those types of lifting forks used on a fork lifts. The lifting forks are used for separately lifting and then stacking either loose packages or pallets on which the loose packages are stacked.

Some prior art equipment have a movable platform attached to the end of the conveyor for persons to stand upon while lifting packages off the conveyor and stacking the packages upon the floor of a shipping container. The movable platform may be moved to different heights so that persons stacking the packages do not have to bend over to either remove the packages from the conveyor or to stack the packages on the container floor. However, persons are still required to lift the weight of each of the packages being stacked within the container.

SUMMARY OF THE INVENTION

A method and apparatus are provided for unloading packages from a conveyor and then stacking the packages in rows on the floor of a shipping container. A package loader is disposed at the discharge end of the conveyor and is moveable with the conveyor into different positions between the forward and aft ends of the shipping container. The package loader includes a frame. A transfer table is mounted to the frame and aligned for receiving packages from the conveyor and supporting the packages as a person arranges the packages in rows extending across the width of the shipping container. A horizontal platform is mounted to the frame forward of the transfer table. The platform is moveable to selected elevations to first align the platform for receiving packages from the conveyor and transfer table, with the packages arranged in rows, and then to align the platform for transferring the rows of the packages onto the floor of the shipping container. The platform is also moveable between rearward and forward positions for extending forward of the frame. An extendable arm is carried by the frame, for aligning adjacent to the rearward end of the platform when the platform is in the forward position. The arm then retains from moving rearward packages stacked upon the platform as the platform is moved rearward, from the forward to the rearward positions, and out from underneath the packages to stack the packages on the floor of the shipping container.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
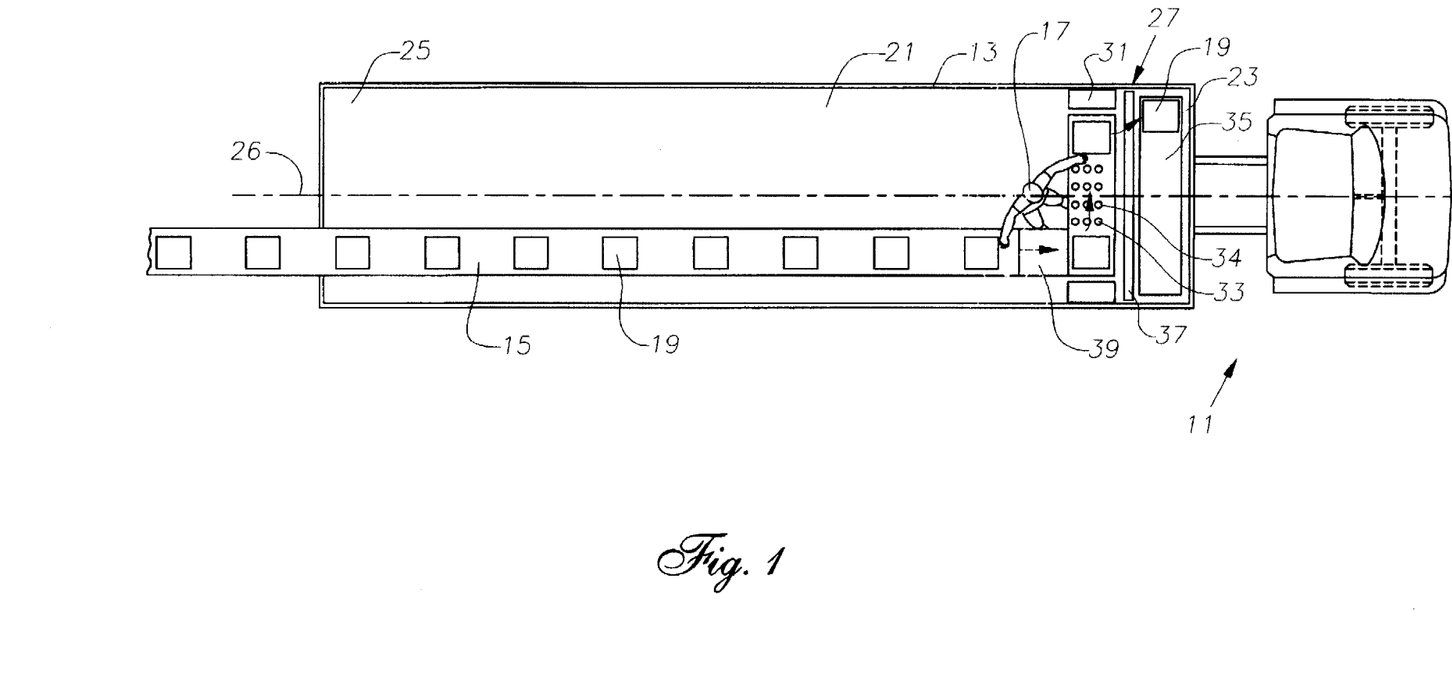
FIG. 1 is a sectional view looking downward into a shipping container mounted to a truck within which a package loader made according to the present invention is schematically depicted.

FIG. 1 is a top view of truck 11 which includes shipping container 13. A shipping container is herein defined as including overseas shipping containers, the storage compartment portion of a van, trailer section of a tractor-trailer rig or bed of a truck, and the like. Shipping container 13 includes a floor 21, forward end 23, aft end 25 and longitudinal axis 26. Conveyor 15 is preferably an expandable type of conveyor which extends within shipping container 13. An operator 17 either stands or sits aside of the discharge end of conveyor 15, for handling packages 19 transported by conveyor 15. Package loader 27 is disposed at the discharge end of conveyor 15 for receiving packages from conveyor 15 and stacking them on floor 21. Package loader 27 handles packages such as boxes, sacks and the like.

Loader 27 includes frame 31, transfer table 33 and horizontal platform 35. Transfer table is preferably a ball transfer table having balls 34 which provide a roller means. Operator 17 slides packages 19 from the discharge end of conveyor 15, across transfer table 33 and onto platform 35 without having to support the weight of the packages 19. Packages 19 are moved on table 33 and aligned in rows for placement on horizontal platform 35 in layers. Platform 35 is moveable and may be moved either upwards or downwards from a position flush with transfer table 33, as well as forward and rearward from table 33. An arm 37 is provided for transferring packages from platform 35 onto floor 21 of container 13. Those of packages 19 which are stacked on platform 35 may either be held in place by arm 37 as platform 35 is moved rearward and out from underneath the packages, or pushed off of platform 35 by arm 37. A transfer extension 39 extends aft on the rearward end of loader 27 for connecting conveyor 15 to frame 31 and transfer table 33.

Figure 2:
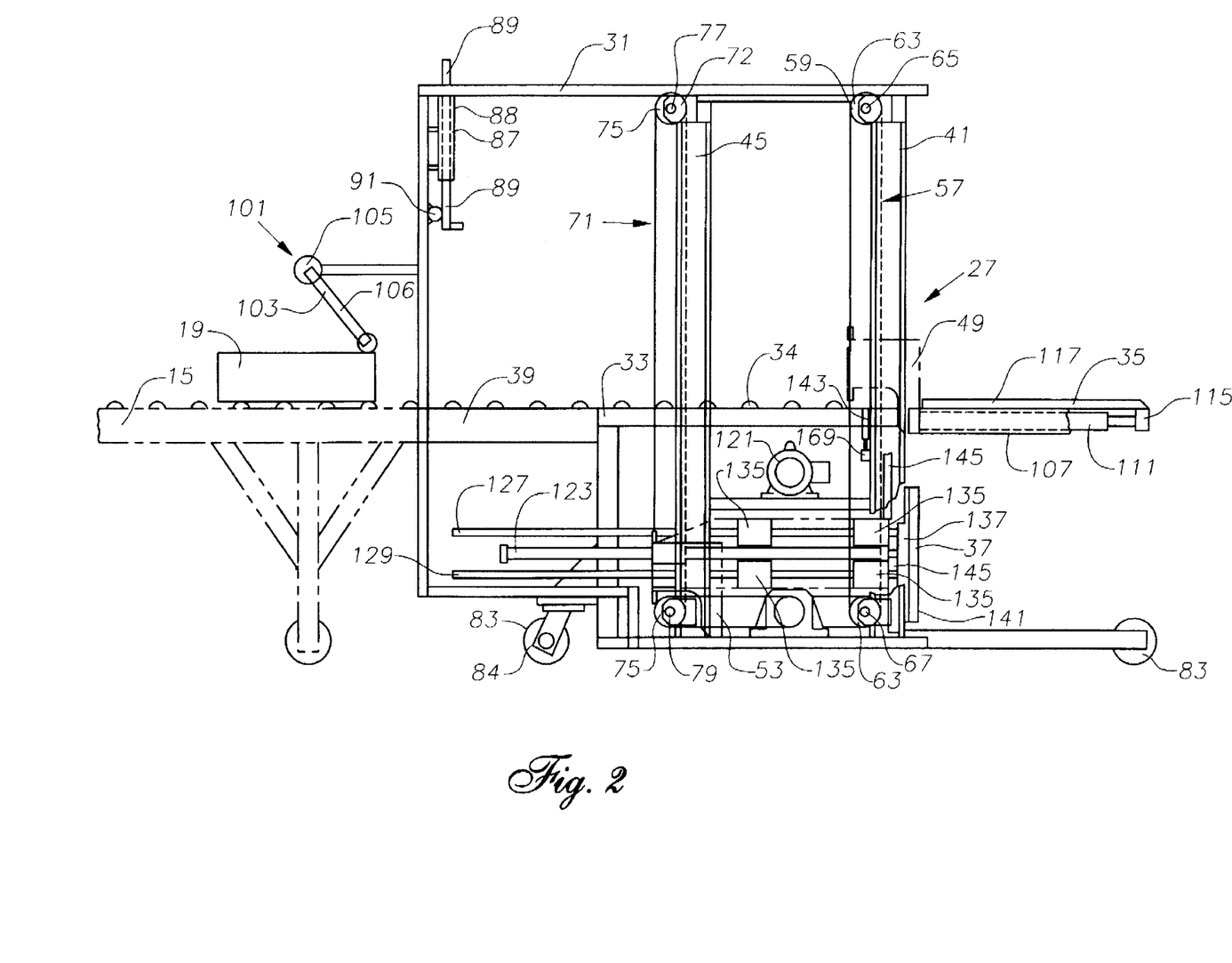
FIG. 2 is a side view of a package loader made according made according to the present invention.
Figure 3:
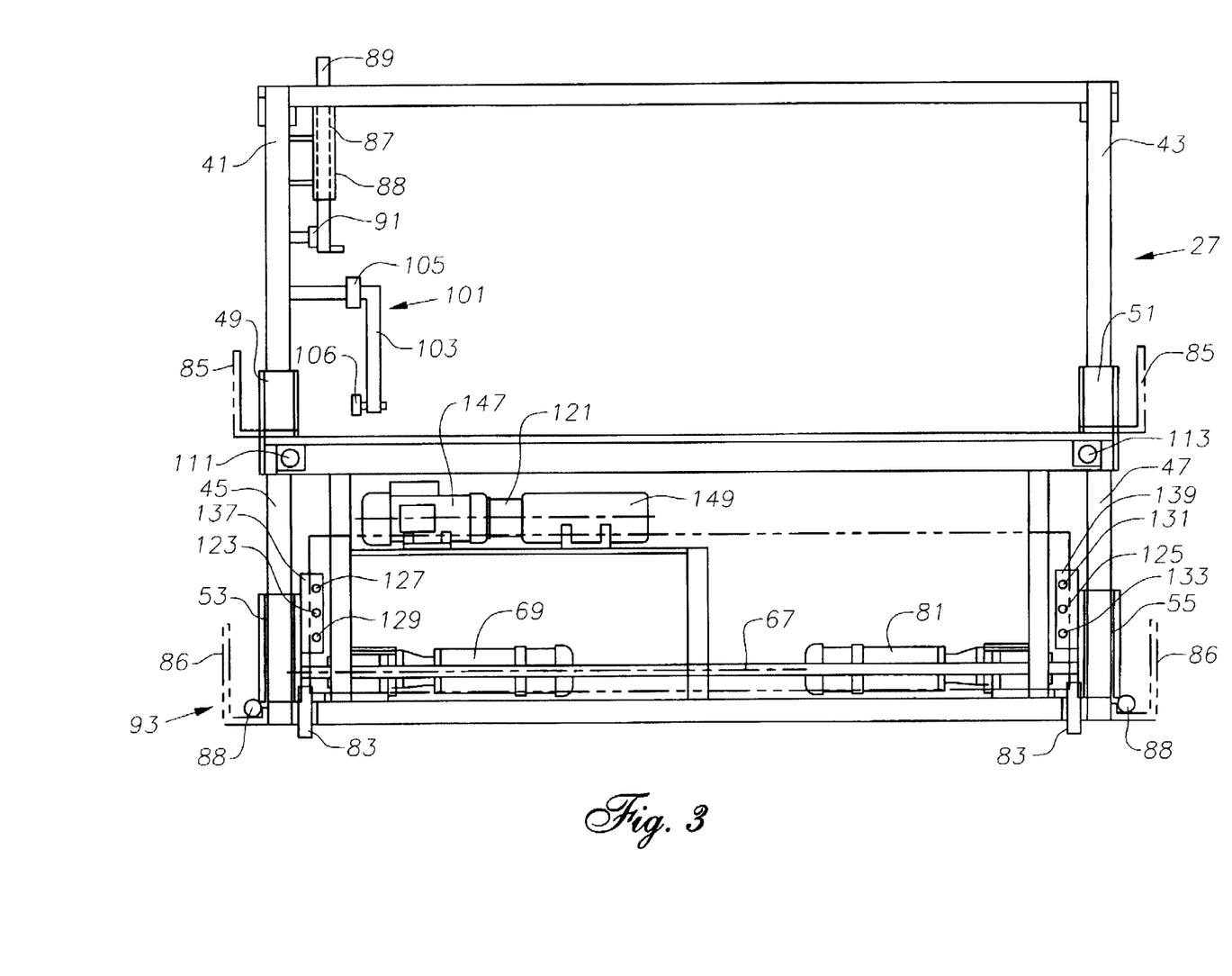
FIG. 3 is a front view of the package loader of FIG. 2.

FIG. 2 is a side elevational view and FIG. 3 is partial cutaway of a front elevational view of loader 27. FIG. 3 is cut away at the lower portions of columns 41, 43, to show columns 45, 47. Loader 27 includes forward vertical columns 41, 43, and aft vertical columns 45, 47. Forward carriages 49, 51 are movably mounted to vertical columns 41, 43, respectively. Aft carriages 53, 55 are movably mounted to vertical columns 45, 47. Forward drive means 57 is provided for moving forward carriages 49, 51 on vertical columns 41, 43, respectively, perpendicular to longitudinal axis 26 of shipping container 13 (shown in FIG. 1). Chains 59, 61 extend around sprockets 63. Linking rods 65, 67 extend between the upper ones of sprockets 63 and lower ones of sprockets 63, respectively, so that chains 59, 61 are moved equal distances. Drive motor 69 powers movement of sprockets 63 to move forward carriages 49, 51 either upwards or downwards, at the same elevation, along vertical columns 41, 43, respectively. Drive motor 69 is preferably an electric motor.

Aft drive means 71 is provided for moving aft carriages 53, 55 upwards and downwards to different elevations on aft vertical columns 45, 47, respectively. Chains 72 extend around two pairs of sprockets 75, respectively. Linking rods 77, 79 connect between upper ones of sprockets 75 and lower ones of sprockets 75, respectively, so that the chains 72 will be moved equal distances by drive motor 81. Drive motor 81 powers aft drive means 71, and preferably is an electric motor.

Wheels 83 are mounted beneath frame 31 and allow movement of loader 27 forward and aft within shipping containers. A brake means 84 is provided on wheels 83, preferably by a disc brake. Brake means 84 is schematically depicted in FIG. 2. Side guards 85 extend along the outward ends of horizontal platform 35, and have rubber bumpers extending therefrom. Side guards 85 are adjustable by sliding inward and outward from horizontal platform 35, and are used to provide a means for preventing packages from falling off the sides of horizontal platform 35.

Lower guides 86 extend from the lower portions of frame 31. Lower guides 86 are connected to encoders 88, which detect the distances that lower guides 86 are extended outward from frame 31 for determining the widths of shipping containers. Lower guides 86 also have rubber bumpers. Lower guides 86 are manually extended by an operator until they touch the sides of a shipping container within which loader 27 is being utilized.

Container height sensor 87 includes a tube 88 mounted to frame 31. An arm 89 is movably extended within tube 88 and coupled to an encoder 91, which senses the distance that arm 89 is moved upwards from within tube 88. Arm 89 is extended upwards from within tube 88 until it touches the roof of a container and the height of the container is determined from the measured distance that arm 89 is extended.

Package height sensor 101 is provided by swing arm 103 and encoder 105 mounted to frame 31. Preferably a roller 106 is mounted to the lower end of swing arm 103. One of packages 19 travelling along conveyor 15 will press against arm 103, swinging arm 103 through an angle which encoder 105 measures. Since the length of arm 103 is known, the height of the packages can be determined from the angle of swing of arm 103 which is measured by encoder 105.

Platform mounting brackets 107, 109 extend from forward carriages 49, 51, respectively. Cylinders for hydraulic actuators 111,113 are mounted to platform mounting brackets 107, 109 and are coupled to two platform actuator brackets 115. Platform 35 further includes a horizontal surface 117, which is mounted to platform actuator brackets 115. Hydraulic power unit 121 is provided for powering hydraulic actuators 111, 113.

Two hydraulic actuators 123, 125 are included in arm 37. Guide rods 127, 129, 131, and 133, two on each side of arm 37, are mounted to eight bearings 135 (four shown in FIG. 2). Bearings 135 are mounted to aft carriages 53, 55. Mounting bracket 137 connects guide rods 127, 129 to hydraulic actuator 123. Mounting bracket 139 connects guide rods 131, 133 to hydraulic actuator 125. A vertical surface 141 provides an end for arm 137. Surface 141 is preferably an end plate provided by a sheet of plexiglass mounted to a support frame made of square tubing. Vertical surface 141 is positioned adjacent to packages stacked on platform 35 to either hold the packages in place as platform 35 is moved rearward and out from underneath the packages, or to push them from platform 35 onto the floor of a shipping container. The rows of packages are transferred from platform 35 on floor 21, either on top of another row of packages, which has been previously stacked on the floor of the shipping container, or directly onto floor 21 (shown in FIG. 1).

Gate 143 extends across the forward end of transfer table 43, between transfer table 43 and horizontal platform 35 to prevent packages from being pushed off the forward end of transfer table 33 when horizontal platform is moved from a position aligned adjacent to transfer table 33. Preferably, gate 143 is actuated by electric solenoids 169 (one shown), on each side of gate 143. However, other types of actuation means may be utilized.

Safety barrier 145 includes two telescoping sheets of plexiglass which are mounted to aft carriages 53, 55 for moving upwards with arm 37. Safety barrier 145 is provided for moving above and in front of transfer table 33 when arm 37 is moved above transfer table 33 and when platform 35 is moved above transfer table 33. Safety barrier 145 provides a guard for preventing an operator from getting his arm caught between transfer table 33, platform 35 or arm 37 to prevent injury to the operator. The two sheets of plexiglass of barrier 145 are each 30 inches tall, and extend across the full width of transfer table 35. Vertical tracks are mounted to and face inward from vertical columns 41, 43 for the two plexiglass sheets to slide upwards within.

The first plexiglass sheet of barrier 145 is rigidly mounted to arm 37, and extends a few inches above the top of arm 37. After arm 37 is raised approximately 30 inches from a lowermost position relative to frame 31, the bottom of the upper plexiglass sheet of barrier 145 will engage the top of the second plexiglass sheet of barrier 145. As arm 37 is moved further upward, the second plexiglass sheet will then be pulled upward. This will move the second plexiglass sheet of barrier 145 into a shielding position. Arm 37 is moved upwards and downwards as necessary to move barrier 145 into a shielding position to protect an operator from injury.

Figure 4:
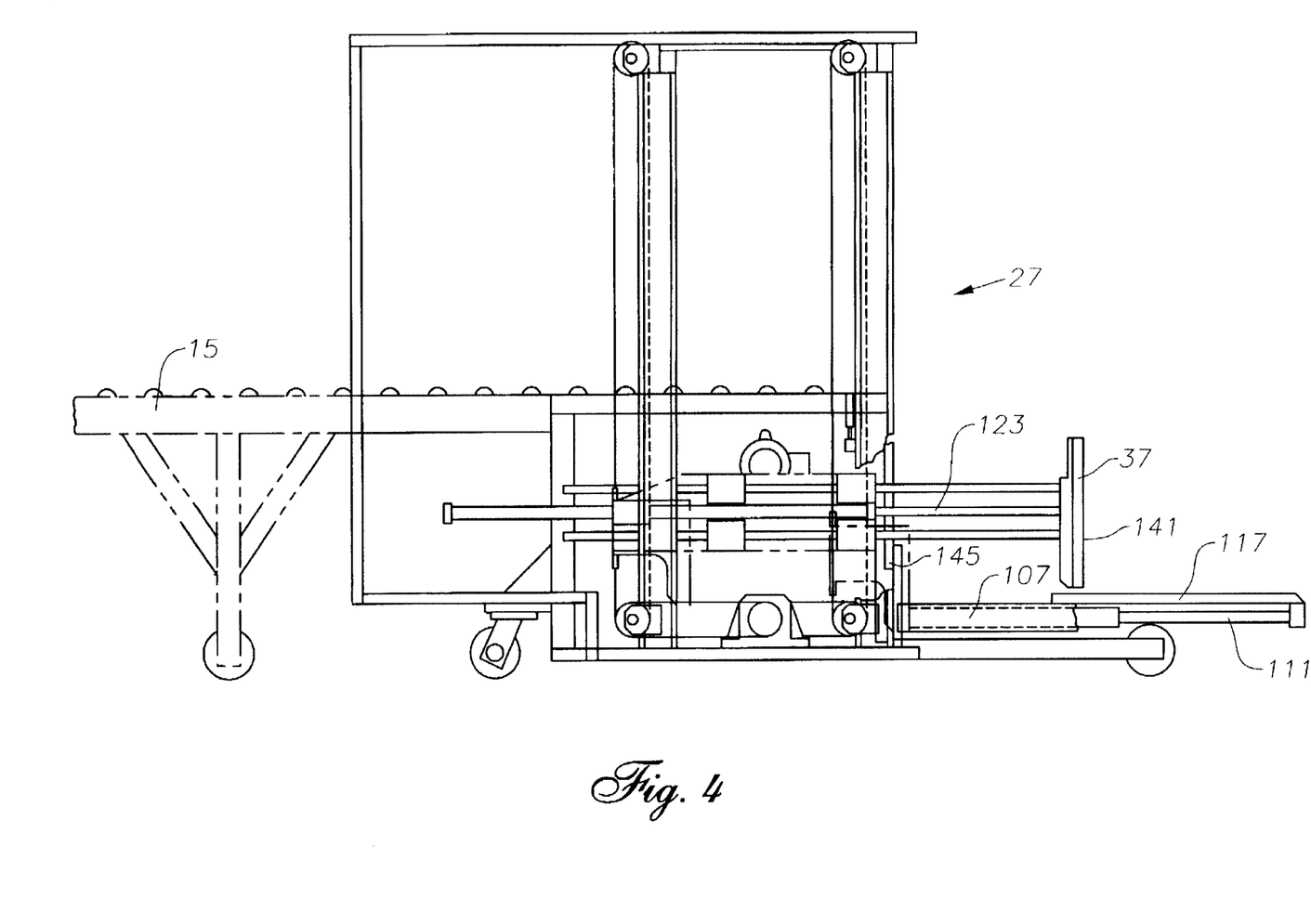
FIG. 4 is a side view of the package loader of FIG. 2, showing a loading platform and arm in extended positions.

FIG. 4 is a side view of the loader 27 of FIG. 2, showing platform 35 and arm 37 extended forward of frame 31. Hydraulic actuators 111, 113 (not shown) have been extended to move horizontal surface 117 of platform 35 outward from frame 31. Hydraulic actuators 123, 125 (not shown) have also been powered to move vertical surface 141 of arm 37 outward from frame 31, and above the aft end of horizontal platform 35. If a row of packages were stacked upon platform 35, they are preferably transferred from platform 35 onto the floor of a shipping container by either pulling platform 35 out from under the packages, as arm 37 holds the packages in place, or pushing the packages off of the top of platform 35 by extending arm 37 further outward from the position shown in FIG. 4 and across the top of platform 35.

Figure 5:
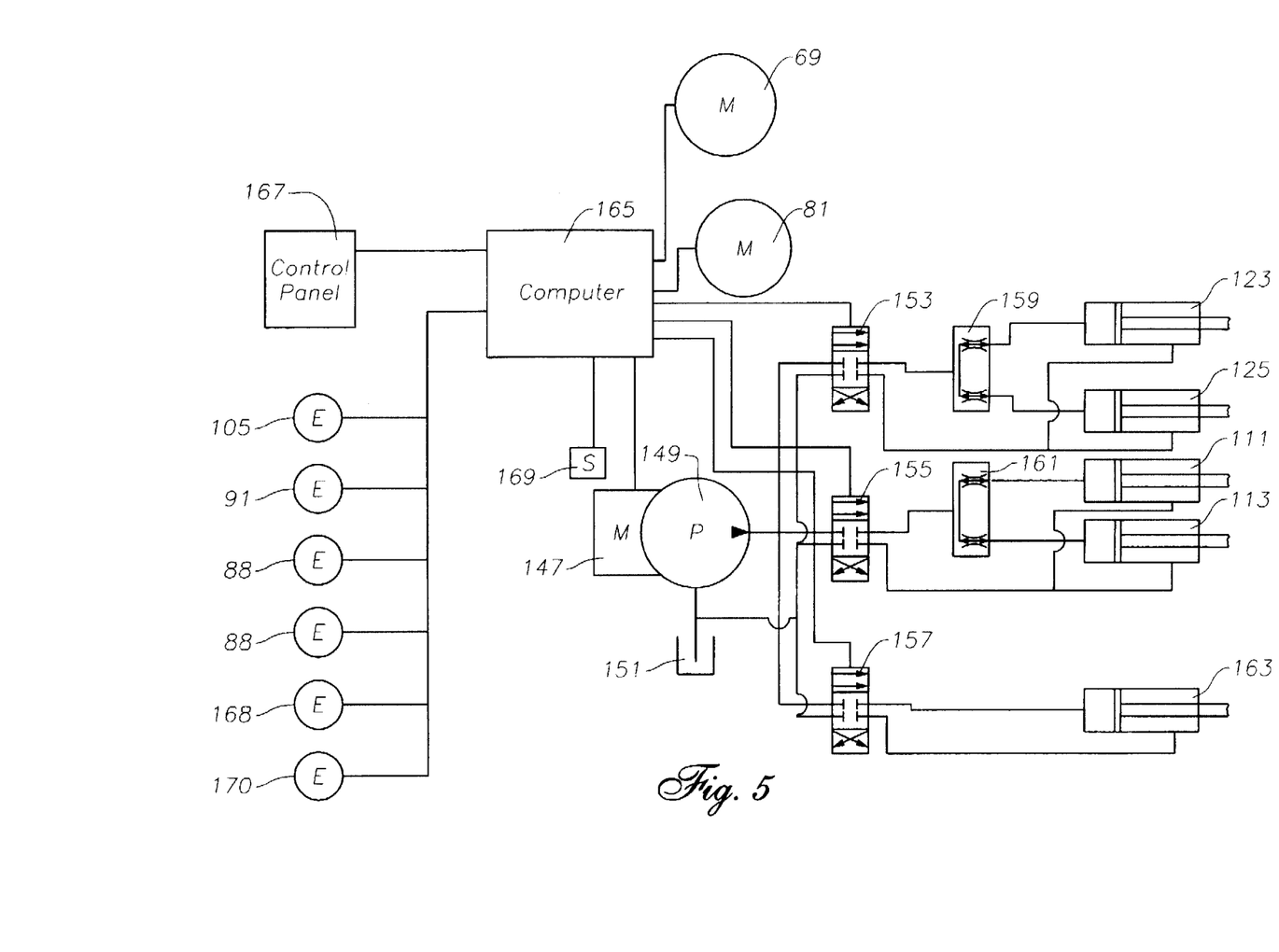
FIG. 5 is a schematic diagram depicting the control and hydraulic circuits of the package loader of FIG. 2.

FIG. 5 is a schematic diagram depicting the control and hydraulic circuits for loader 27. Hydraulic power unit 121 includes motor 147, hydraulic pump 149 and fluid reservoir 151. Directional control valves 153, 155 and 157 are powered by electric solenoids between three positions for selectively controlling the flow of hydraulic fluid to different ones of hydraulic actuators 111, 113, 123, 125 and 163. Typically, hydraulic fluid will be selectively passed through only one of directional control valves 153, 155 and 157 at a time.

Flow divider 159 is provided for diverting equal amounts of flow either to or from hydraulic actuators 123, 125. Actuators of 123, 125 control extension and retraction of arm 37 from the forward end of loader 27. Flow divider 161 is connected to hydraulic actuators 111, 113, and provides an equal flow either to or from hydraulic actuators 111, 113. Hydraulic actuators 111, 113 control extension and retraction of horizontal platform 35 from the forward end of loader 27. Directional control valve 157 is connected directly to hydraulic actuator 163, which controls disc brake 84 (schematically depicted in FIG. 2).

Controller unit 165 is a computer which controls operation of package loader 27. Carriage motors 69, 81 are electric motors which are directly controlled by computer 165. Encoders 88, 91 and 105 are also connected to computer 165 for imputing the width and height of a shipping container in which loader 27 is being used, and for detecting the height of packages being stacked by loader 27. Control panel 167 is provided for operator input. An operator may manually control the movement of horizontal platform 35 and arm 37, or may utilize the computer for automatically indexing the platform 35 and arm 37. Electric solenoids 169 control the raising and lowering of safety gates 143.

Position detectors 168, 170 are schematically depicted in FIG. 5. They are spaced apart and mounted to forward columns 41, 43 and aft columns 45, 47, respectively, for detecting the positions of forward carriages 49, 51 and aft carriages 53, 55, respectively. Positions detectors 168, 170 are preferably encoders which are mounted to one of sprockets 63 and one of sprockets 75, respectively, to determine the number of revolutions that sprockets 63 and 75 are rotated in moving carriages 49, 51 and carriages 53, 55 from home positions. In other embodiments, position detectors may be provided by other type of means, such as inductive proximity switches, microswitches, infrared detectors, and the like.

Figure 6:
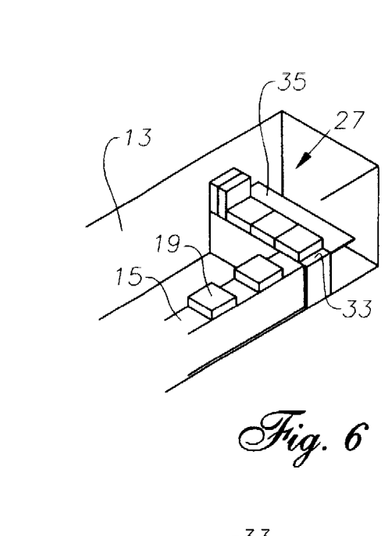
FIGS. 6 through 13 are cutaway perspective views which schematically depict operation of a package loader made according to the present invention.

FIGS. 6–13 are cutaway, perspective views which schematically depict package loader 27 being utilized within shipping container 13. Referring to FIG. 6, package loader 27 has been moved to the forward end of container 13, and conveyor 15 has been extended inward and connected to the aft end of loader 27. Forward horizontal platform 35 has been raised upward for alignment adjacent to, at the same elevation of transfer table 33, flush with table 33. With platform 35 flush with transfer table 33, packages 19 may be moved from transfer table 33 onto platform 35. A plurality of packages 19 have been moved down conveyor 15 and discharged on to transfer table 33. The plurality of the packages 19 have been aligned in a row, of a single layer, for moving forward onto horizontal platform 35.

Figure 7:
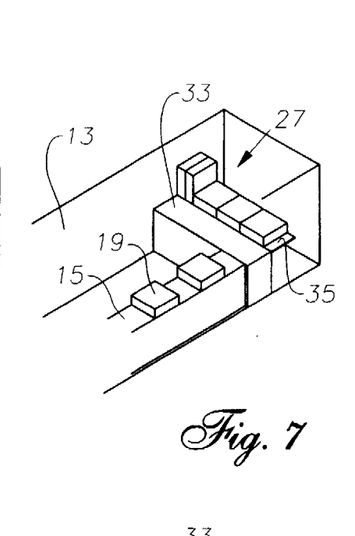

FIG. 7 depicts the first layer of packages 19 having been pushed forward from transfer table 33 onto horizontal platform 35. The first layer extends substantially across the width of container 13. Also, the two packages to the farthest left are mounted with their longest dimensions extending vertically, and three packages extending to the right on platform 35 have been laid flat, end to end, with their longest dimensions extending horizontally.

Figure 8:
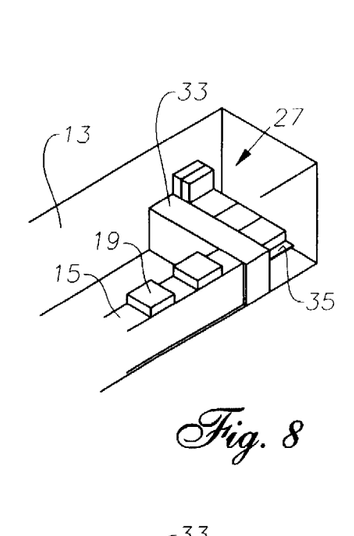
Figure 9:
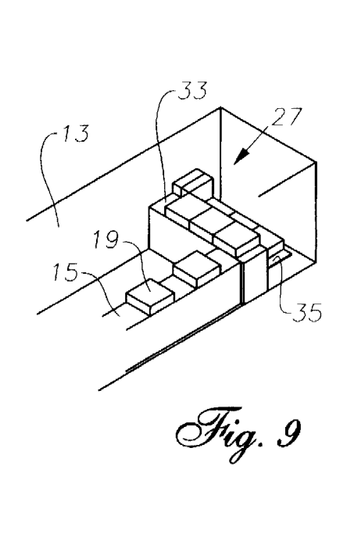
Figure 10:
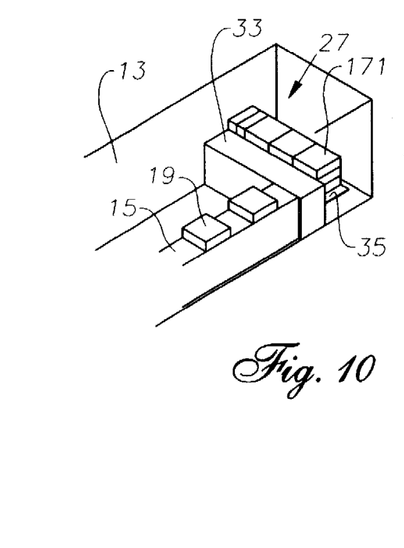

FIG. 8 depicts horizontal platform 35 being indexed downward until the tops of the three right most ones of packages 19 are aligned, at the same elevation, as the top of transfer table 33. Then, FIG. 9 depicts three more of packages 19 being aligned to horizontally extend end to end across a substantial portion of container 13. FIG. 10 depicts the three packages after being pushed forward onto horizontal platform 35. This aligns packages 19 on platform 35 in a single row 171 of packages for stacking upon floor 21.

Figure 11:
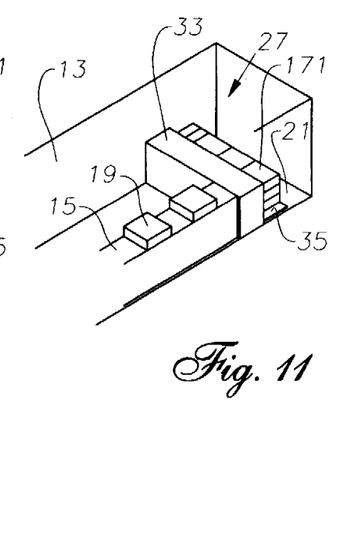
Figure 12:
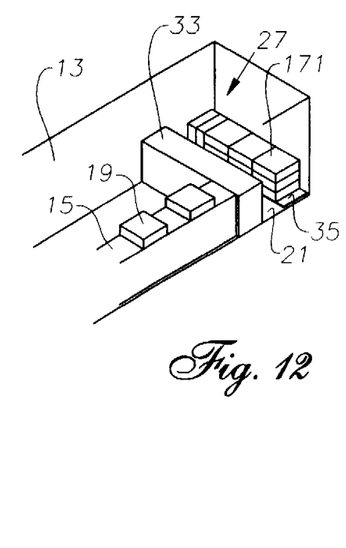

In FIG. 11, horizontal platform 35 is moved downward until row 171 of packages 19 is adjacent to floor 21, just in front of the position where row 171 is to be stacked upon floor 21. In FIG. 12, the platform 35 is shown having been extended forward into a forward position, with the packages above the position in container 13 where they are to be stacked on floor 21. In the preferred embodiment, arm 37 will then be extended to a position adjacent to the rearward end of row 171. Platform 35 will then be retracted from underneath row 171 as arm 37 holds the packages in place until platform 35 is pulled out from underneath row 171 to stack the packages 19 of row 171 on floor 21. In other embodiments, arm 37 may be extended from a retracted position forward across platform 35 to an extended position to push row 171 from platform 35.

Figure 13:
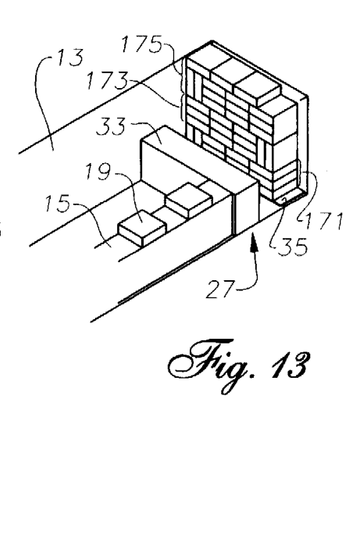

FIG. 13 shows two additional rows 173, 175 having been stacked on floor 21, on top of row 171. Package loader 27 is then moved backwards the width of rows 171, 173 and 175, and the process is repeated to stack more rows of packages adjacent to rows 171, 173 and 175.

Figure 14:
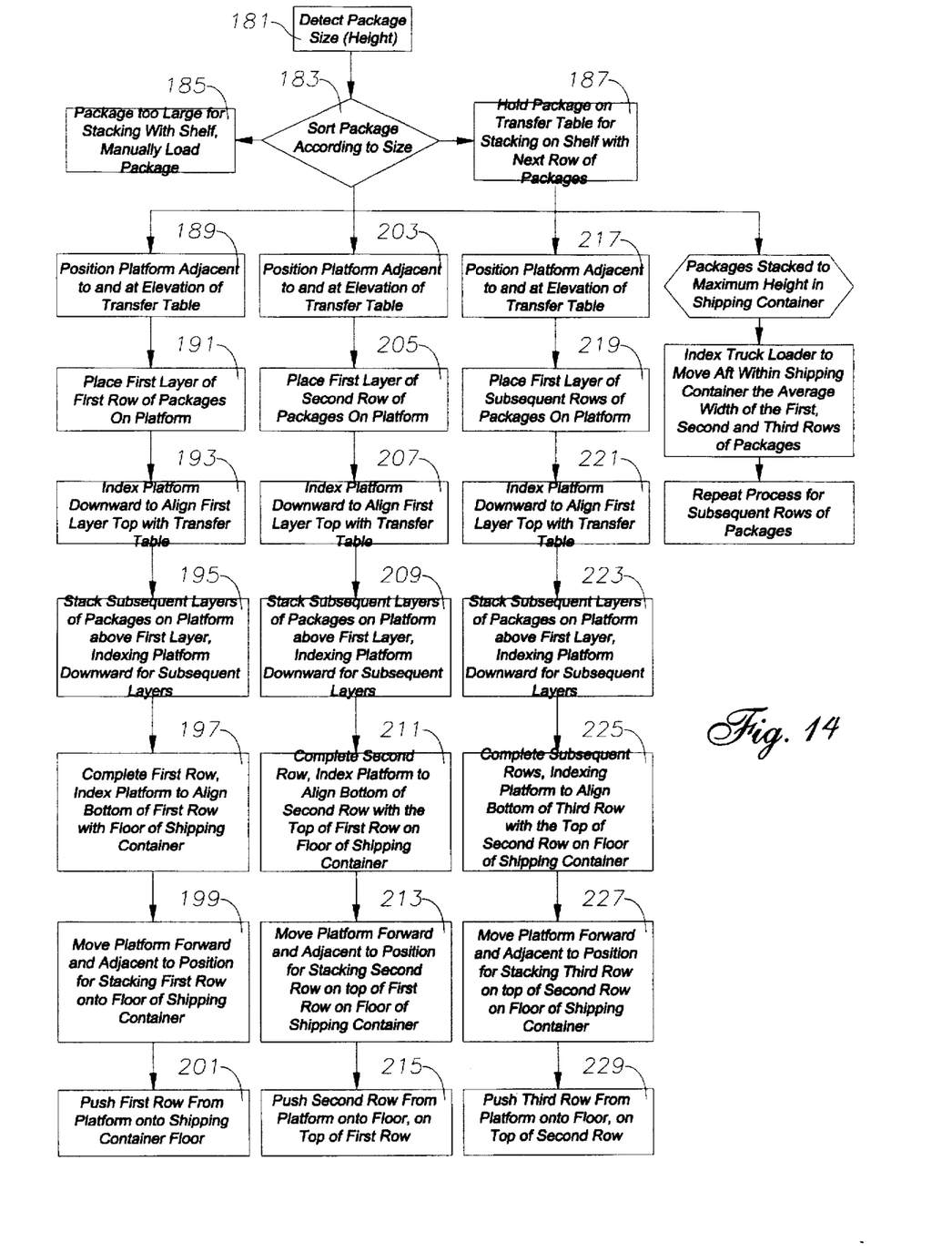
FIG. 14 is a block diagram depicting operation of a package loader of the present invention.

FIG. 14 is a block diagram depicting operation of loader 27. Referring to FIGS. 6 through 13 and FIG. 14, after conveyor 15 and package loader 27 are connected together in the forward end of a shipping container 13 and the height and width of the container 13 are determined, packages 19 are carried forward into container 13 on the conveyor 15. At block 181, the size, preferably the height, of packages 19 are detected. In block 183, packages 19 are sorted according to size. If one of packages 19 is too large for stacking on platform 35 of the loader 27, that package is set aside for manually loading, or stacking, within shipping container 13, as depicted in block 185. If in the step of block 183 a package is determined to be of the appropriate height for stacking on platform 35 in a row which is currently being processed, it will then be positioned on platform 35 as depicted in blocks 191.

If the one of packages 19 is of the appropriate height for stacking on platform 35, yet is too large for fitting on one of the remaining layers of a row made up of other ones of packages 19 which have already been placed on platform 35, that package will be held aside on transfer table 33 until the current row is processed, as depicted in block 187. Then later, this package will be positioned on platform 35 as depicted in blocks 189, 203, and 217.

In block 189, platform 35 will be positioned adjacent to and at the same elevation as transfer table 33. Then in block 191, the first layer of a row of packages is placed on platform 35, such as depicted in FIGS. 6 and 7. Then, in the step of block 193, platform 35 is moved downward to align the top of the first layer of packages with transfer table 33, as depicted in FIG. 8.

Block 195 depicts the step of stacking subsequent layers of packages 19 on platform 135 above the first layer, then indexing platform 135 downward for stacking a subsequent layer on platform 35. These steps of block 195 are also depicted in FIGS. 9 and 10, discussed above. Then, in block 197, once the first row 171 of packages 19 has been stacked upon platform 35, platform 35 is moved downward to align the bottom of first row 171 of packages 19 adjacent to floor 21 of shipping container 13, that is, just above floor 21, as depicted in FIG. 11. Then, platform 35 is moved forward and adjacent to the position for stacking the rows on shipping container floor 21, as depicted in FIG. 12. Then, in the step of block 201, arm 37 is aligned with first row 171 of packages 19, and row 171 is held in place by arm 71 as platform 35 is pulled from underneath row 171, to transfer row 171 onto shipping container floor 21. This then positions first row 171 in the position shown in FIG. 12.

Then the package stacking process is repeated for the next row, row 173 of FIG. 13. First, as depicted in block 203, platform 35 is positioned adjacent to transfer table 33, flush with transfer table 33. In blocks 205, 207, and 209 the second row 173 of packages is stacked on horizontal platform 35. Then, in the step of block 211, the bottom of second row 173 of packages and platform 35 are indexed to a forward position adjacent to the top of the first row 171 of packages. In the steps of blocks 213 and 215, platform 35 is then moved forward and arm 33 is extended, and row 173 is transferred from being supported by platform 35 to floor 21, on top of first row 171.

Then, third row 175 may be stacked upon the first and second rows 171, 173, as depicted in FIG. 13. In the step of block 217, platform 35 will be repositioned flush with transfer table 33. Then, as depicted in steps 219, 221 and 223, third row 175 will be stacked upon platform 35. After third row 175 is stacked upon platform 35, in the step of block 225, platform 35 is moved forward and raised to an appropriate height, or elevation, to align the bottom of third row 175 with the top of the second row 173, above row 173. Then in the steps depicted in blocks 227 and 229, third row 175 will be stacked on floor 21 on top of first row 171 and second row 173.

Once the packages are stacked to the maximum height in the shipping container, as depicted in block 231, in block 233 the package loader is moved rearward within shipping container 13 the length of rows 171, 173 and 175, along longitudinal axis 26 (shown in FIG. 1). Block 235 depicts repeating the above process for stacking subsequent rows within shipping container 13 until container 13 is fully loaded.

It should be noted that other embodiments of the present invention may provided which have only manual controls, without computer controls. Still other embodiments may be fully automated for stacking boxes within shipping containers. Additionally, a detection means may be provided for detecting when an operator may be reaching between arm 37, platform 35 and transfer table 33 to stop operation of loader 27 to prevent injury to the operator. Such a detection means may be provided by a plurality of infrared sensors. Other embodiments of the present invention may also detect the length and width of packages, not just the height of the top of packages above the conveyor. For example, additional swing arms and encoders may be provided which are oriented to swing in planes which are perpendicular to the vertical plane within which swing arm 103 of box height sensor 101 extends. Also, other types of sensing means may be utilized other than swing arms and encoders.

The present invention provides several advantages over prior art container loading systems. An assortment of loose packages may be individually transported into a shipping container, then stacked in rows, one row upon another, on the floor of the shipping container. An operator may slide packages from a transfer table directly onto a horizontal platform which is movable between selected elevations. The operator does not have to lift the packages but merely slides the packages from the conveyor, across the transfer table and onto the horizontal platform, with the transfer table supporting the weight of the packages. The stacking platform is the automatically indexed to selected elevations for stacking the packages upon the platform in several layers to make up rows, which are then automatically stacked by the loader of the present invention in rows that extend substantially across the width of the shipping container.

The loader may be either manually operated or automatically operated by a computer to optimize stacking of the packages. Either uniform or nonuniform sized packages may be stacked within a shipping container by a package loader of the present invention. The sizes of the packages are detected by a swing arm connected to a height encoder. Further, a safety barrier is provided to prevent an operator from extending a portion of his body past the transfer table into regions in which the push arm and horizontal platform are moving to prevent injury to the operator.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

We claim:

1. An apparatus for unloading packages from a conveyor and stacking the packages in rows on a floor of a shipping container, the apparatus comprising in combination:

a frame having a longitudinal axis and disposed at a discharge end of the conveyor, the frame being moveable in the shipping container for disposing in various positions between forward and aft ends of the shipping container;

a platform mounted to the frame in a horizontal plane which is parallel to the floor when disposed in the shipping container;

elevator means for moving the platform relative to the frame and perpendicular to the longitudinal axis for receiving the packages from the conveyor and for transferring the packages from the platform onto the floor of the container and onto rows of the packages previously stacked in the container;

an arm carried by the frame for movement along the longitudinal axis relative to the platform from a retracted position to an extended position for transferring the packages from the platform onto the floor of the shipping container and onto rows of the packages previously stacked in the container; and the elevator means preventing tilting of the platform relative to the horizontal plane so as to allow multiple rows of the packages to be stacked onto the platform before the arm transfers the multiple rows from the platform onto the shipping container.

2. The apparatus of claim 1, further comprising a pair of guide arms, one mounted to each side of the platform for movement with the platform perpendicular to the longitudinal axis, the guide arms being moveable inward and outward relative to each other to adjust a width of the platform to the shipping container.

3. The apparatus of claim 1, further comprising a transfer table mounted to the frame rearward of the platform and having a plurality of rollers to facilitate manually moving the packages from the conveyor to the platform.

4. The apparatus of claim 1 wherein the elevator means moves the platform perpendicular to the longitudinal axis independently of the arm.

5. The apparatus of claim 1 wherein the arm is located rearward of a rearward edge of the platform while in the retracted position.

6. The apparatus of claim 1, further comprising:
positioning means for raising and lowering the arm perpendicular to the longitudinal axis relative to the platform.

7. The apparatus of claim 6, further comprising a transfer table located rearward of the platform to facilitate manually moving the packages, the elevator means being capable of lifting the platform above the transfer table for stacking packages on top of previously stacked packages; and
a safety barrier movably carried by the frame for moving in front of the transfer table and rearward of the platform when the platform is moved above the transfer table.

8. The apparatus of claim 1, further comprising means for moving the arm vertically relative to the platform and for retracting the arm to a position rearward of the platform to allow multiple rows of packages to be stacked on the platform.

9. An apparatus for stacking packages in rows on a floor of a shipping container, the apparatus comprising in combination:
a conveyor for extending from a loading dock into the shipping container;
a frame disposed at a discharge end of the conveyor, and moveable in the shipping container to various positions between forward and aft ends of the shipping container, the frame having a longitudinal axis which is in a horizontal plane parallel to the floor of the shipping container when in the shipping container;
a transfer table disposed at the frame and adjacent to the discharge end of the conveyor for receiving the packages from the conveyor, the transfer table extending perpendicular to the longitudinal axis;
an elevator mounted to the frame and having a platform for moving vertically relative to the frame at selected elevations to align the platform with the transfer table for receiving the packages from the transfer table, and then to align the platform for transferring rows of the packages from the platform onto the floor of the container and onto rows of the packages previously stacked in the container;
an arm carried by the frame and extending substantially across a width of the platform;
pushing means for moving the arm along the longitudinal axis, independent of the platform, from a retracted position rearward of a rearward edge of the platform to an extended position forward of the rearward edge of the platform for transferring the packages from the platform onto the floor of the shipping container; and
positioning means for moving the arm vertically relative to the platform to a rest position vertically spaced from and rearward of the rearward edge of the platform while packages are being transferred to the platform to allow at least two rows of packages to be stacked onto the platform prior to transfer to the floor in the shipping container.

10. The apparatus of claim 9 wherein the platform remains in a horizontal plane which is parallel to the floor when disposed in the shipping container while being raised and lowered by the elevator.

11. The apparatus of claim 9 wherein the pushing means includes a piston that strokes parallel to the longitudinal axis, and the positioning means moves the piston vertically while the piston remains parallel to the longitudinal axis.

12. The apparatus of claim 9, wherein positioning means moves the arm below the platform when the arm is disposed in the rest position.

13. The apparatus of claim 9 wherein the conveyor is offset to one side of the transfer table to allow a person to manually move the packages from the conveyor to the transfer table and to the platform.

14. The apparatus of claim 9, further comprising a pair of guide arms, one mounted to each side of the platform for movement with the platform perpendicular to the longitudinal axis, the guide arms being moveable inward and outward relative to each other to adjust a width of the apparatus to the shipping container.

15. The apparatus of claim 9 further comprising a safety barrier movably carried by the frame for moving in front of the transfer table and rearward of the platform when the platform is moved above the transfer table.

16. An apparatus for stacking packages in rows on a floor of a shipping container, the apparatus comprising in combination:
a conveyor for extending from a loading dock into the shipping container;
a frame disposed at a discharge end of the conveyor and moveable in the shipping container to various positions between forward and aft ends of the shipping container, the frame having a longitudinal axis which is in a horizontal plane parallel to the floor of the shipping container when in the shipping container;
a platform mounted to the frame;
transfer means for laterally staging the packages into a row on the platform which extends perpendicular to the longitudinal axis of the shipping container;
elevator means for moving the platform relative to the frame and perpendicular to the longitudinal axis for aligning the platform at selected elevations for receiving the rows of the packages from the transfer means, for transferring the rows of the packages from the platform onto the floor of the container and for transferring rows on top of previously stacked rows;
the platform further being moveable relative to the frame and along the longitudinal axis between a rearward position and a forward position;
a pair of guide arms, one mounted to each side of the platform for movement with the platform perpendicular to the longitudinal axis, the guide arms being moveable inward and outward relative to each other to adjust a width of the platform to the shipping container;
a push arm carried by the frame and extending substantially across a width of the platform;
a piston carried by the frame parallel to the longitudinal axis for moving the push arm along the longitudinal axis, independent of the platform, from a retracted position rearward of a rearward edge of the platform to an extended position forward of the rearward edge of the platform, for transferring the rows of the packages from the platform to the floor; and positioning means for moving the piston and the push arm above and below the platform while the piston remains parallel to the longitudinal axis.

17. The apparatus of claim 16 wherein the transfer means comprises a table having a plurality of rollers to facilitate manually moving the packages, the elevator means being capable of lifting the platform above the table for stacking packages on top of previously stacked packages; and wherein the apparatus further comprises a safety barrier movably carried by the frame for moving in front of the table and rearward of the platform when the platform is moved above the table.

18. The apparatus of claim 16 wherein the elevator means maintains the platform parallel to the floor of the shipping container while raising and lowering the platform.

19. The apparatus of claim 16 wherein the transfer means comprises a table mounted to the frame perpendicular to the longitudinal axis; and wherein the conveyor joins the table and is offset from the longitudinal axis to provide room for personnel to stand in front of the table and manually move the packages from the conveyor to the table and to the platform.

* * * * *